United States Patent
Dolby et al.

(10) Patent No.: US 10,409,711 B2
(45) Date of Patent: Sep. 10, 2019

(54) AUTOMATICALLY RUNNING TESTS AGAINST WEB APIS BASED ON SPECIFICATIONS

(71) Applicant: International Business Machines Corporation, Armonk, NY (US)

(72) Inventors: Julian Timothy Dolby, Bronx, NY (US); Jim Alain Laredo, Katonah, NY (US); Aleksander Slominski, Riverdale, NY (US); John Erik Wittern, New York, NY (US); Annie T. Ying, Vancouver (CA); Christopher Young, Kitchener (CA); Yunhui Zheng, Elmsford, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/620,769

(22) Filed: Jun. 12, 2017

(65) Prior Publication Data
US 2018/0357154 A1    Dec. 13, 2018

(51) Int. Cl.
*G06F 11/36*    (2006.01)
(52) U.S. Cl.
CPC ...... *G06F 11/3684* (2013.01); *G06F 11/3664* (2013.01); *G06F 11/3688* (2013.01); *G06F 11/3692* (2013.01)
(58) Field of Classification Search
CPC .......................... G06F 11/3664–3696
See application file for complete search history.

(56) References Cited

U.S. PATENT DOCUMENTS

| | | | | |
|---|---|---|---|---|
| 5,878,054 A | * | 3/1999 | Sherwood | G01B 31/318307 714/739 |
| 5,913,023 A | * | 6/1999 | Szermer | G06F 11/3684 714/38.1 |
| 6,321,376 B1 | * | 11/2001 | Willis | G06F 8/10 717/124 |
| 6,415,396 B1 | * | 7/2002 | Singh | G06F 11/3688 714/25 |

(Continued)

OTHER PUBLICATIONS

Bai et al., WSDL-Based Automatic Test Case Generation for Web Services Testing, Proceedings of the 2005 IEEE International Workshop on Service-Oriented System Engineering (SOSE'05), 2005, pp. 1-6.*

(Continued)

*Primary Examiner* — Thuy Dao
*Assistant Examiner* — Zheng Wei
(74) *Attorney, Agent, or Firm* — Intelletek Law Group, PLLC; Gabriel Daniel, Esq.

(57) ABSTRACT

A method and system of determining whether a specification is an accurate representation of an application program interface (API) is provided. The specification is received electronically over a network. Service calls to be tested are identified based on the specification. A test case is created for each of the identified service calls. A sequence is created for the test cases. A test plan is generated based on the created sequence. The generated test plan is executed. Upon identifying an error in response to the executed test plan, a notification is generated, indicating that the specification is not an accurate representation of the API.

18 Claims, 7 Drawing Sheets

(56) References Cited

U.S. PATENT DOCUMENTS

| | | | | |
|---|---|---|---|---|
| 6,651,186 B1* | 11/2003 | Schwabe | G06F 9/44589 | 714/38.14 |
| 6,898,784 B1* | 5/2005 | Kossatchev | G06F 11/3684 | 714/E11.208 |
| 6,981,245 B1* | 12/2005 | Schwabe | G06F 9/44589 | 713/155 |
| 7,243,090 B2* | 7/2007 | Kinzhalin | G06F 11/3672 | |
| 7,389,495 B2* | 6/2008 | Wang | G06F 21/53 | 717/124 |
| 7,493,597 B2* | 2/2009 | Hefner | G06F 11/3684 | 717/124 |
| 7,536,679 B1* | 5/2009 | O'Connell | G06F 9/44521 | 717/126 |
| 7,685,576 B2* | 3/2010 | Hartmann | G06F 11/3684 | 717/105 |
| 7,778,866 B2* | 8/2010 | Hughes | G06F 8/20 | 705/7.42 |
| 8,065,662 B1 | 11/2011 | Trounine et al. | | |
| 8,275,855 B2* | 9/2012 | Kothari | H04L 43/50 | 709/218 |
| 8,347,276 B2* | 1/2013 | Schadow | G06F 8/20 | 715/239 |
| 8,745,641 B1* | 6/2014 | Coker | G06F 11/3668 | 719/313 |
| 8,949,792 B2* | 2/2015 | Paterson | G06F 11/3664 | 714/38.1 |
| 9,021,440 B1* | 4/2015 | Chandrasekaran | G06F 11/3684 | 717/124 |
| 9,218,269 B2* | 12/2015 | Dolinina | G06F 11/3672 | |
| 9,471,405 B1* | 10/2016 | Mor | G06F 17/5009 | |
| 9,552,237 B2* | 1/2017 | Biesack | G06F 9/541 | |
| 9,864,674 B2* | 1/2018 | Singi | G06F 11/3684 | |
| 9,948,698 B2* | 4/2018 | Exton | H04L 67/02 | |
| 9,948,702 B2* | 4/2018 | Exton | H04L 67/02 | |
| 9,952,855 B2* | 4/2018 | Finnie | G06F 8/70 | |
| 10,007,597 B2* | 6/2018 | Barnett | G06F 11/3684 | |
| 10,180,900 B2* | 1/2019 | Ramraz | G06F 11/3684 | |
| 2002/0198868 A1* | 12/2002 | Kinzhalin | G06F 11/3672 | |
| 2003/0028856 A1* | 2/2003 | Apuzzo | G06F 11/3684 | 717/124 |
| 2003/0196189 A1* | 10/2003 | Wang | G06F 11/3664 | 717/124 |
| 2004/0153827 A1* | 8/2004 | Schwabe | G06F 9/44589 | 714/38.14 |
| 2004/0243881 A1* | 12/2004 | Wang | G06F 21/53 | 714/37 |
| 2005/0160395 A1* | 7/2005 | Hughes | G06F 8/20 | 717/102 |
| 2006/0190771 A1* | 8/2006 | Hefner | G06F 11/3684 | 714/38.14 |
| 2006/0265691 A1* | 11/2006 | Klinger | G06F 11/3684 | 717/124 |
| 2009/0164621 A1* | 6/2009 | Kothari | H04L 43/00 | 709/224 |
| 2013/0191814 A1* | 7/2013 | Fujii | G06F 11/3684 | 717/124 |
| 2013/0290932 A1 | 10/2013 | Kruglick | | |
| 2014/0068340 A1* | 3/2014 | Dayal | G06F 11/3672 | 714/38.1 |
| 2014/0075242 A1* | 3/2014 | Dolinina | G06F 11/3672 | 714/27 |
| 2014/0289699 A1 | 9/2014 | Paterson et al. | | |
| 2016/0147578 A1* | 5/2016 | Biesack | G06F 9/541 | 719/328 |
| 2016/0299936 A1* | 10/2016 | Chavda | G06F 11/36 | |
| 2017/0004064 A1* | 1/2017 | Rufai | G06F 11/3612 | |
| 2017/0046254 A1* | 2/2017 | Buege | G06F 11/3692 | |
| 2017/0124210 A1 | 5/2017 | Suter et al. | | |
| 2017/0124211 A1 | 5/2017 | Suter et al. | | |
| 2018/0089066 A1* | 3/2018 | Barnett | G06F 11/3684 | |
| 2018/0276109 A1* | 9/2018 | Archer | G06F 11/3688 | |

OTHER PUBLICATIONS

Understanding Rest, Retrieved online from Internet Archive Wayback Machine [https://web.archive.org/web/20141229093825/https://spring.io/understanding/REST], published online before 2014, p. 1.*

Hierons et al., Using Formal Specifications to Support Testing, published by ACM Computing Surveys, vol. 41, No. 2, Article 9, Publication date: Feb. 2009, pp. 1-76 (Year: 2009).*

Tsai et al., Extending WSDL to Facilitate Web Services Testing, Proceedings of the 7th IEEE International Symposium on High Assurance Systems Engineering (HASE'02), pp. 1-2 (Year: 2002).*

Dietz, Noah. [online], Fulfilling a RESTful Commitment: Test-Suite Generation for Swagger-based REST APIs. California Polytechnic State University, Jun. 2016 [retrieved on May 18, 2017], Retrieved from the Internet: , 39 pages.

Liu et al., "Automated Testing of Web Services Based on Algebraic Specifications," SOSE '15 Proceedings of the 2015 IEEE Symposium on Service-Oriented System Engineering (Mar. 30-Apr. 3, 2015), pp. 143-152.

U.S. Appl. No. 15/403,150, "Generating Web API Specification from Online Documentation" filed Jan. 10, 2017.

* cited by examiner

```
Example

POST /users // get id=1 from resp.
POST /users/1/orders
POST /users/1/orders/1/status
GET  /users/1/orders/1/status
...
DELETE /users/1/orders/1/status/1
GET /users/1/orders/1
...
DELETE /users/1/orders/1
GET /users/1
...
DELETE /users/1
```

| Error | Identified Cause | How Error Detected |
|---|---|---|
| Base URL | API is not available at base URL defined in specification | Request times out; all requests return 404 (not found) |
| Endpoint | API does not provide the requested endpoint (URL template + HTTP method) | API returns 404 (not found) or 301 (moved permanently) |
| Data definitions | API does not accept data sent (in case of POST, PATCH, or PUT) | API returns 400 (bad request) |
| Data definitions | API returns unexpected / wrong data | Request succeeds, but returned data does not match data definition in the specification |
| Parameters (query or header) | API does not accept request with the provided query (in case of GET) and header parameters (for all methods) | API returns 400 (bad request) |
| Authentication information | API is not invokable with the authentication information used | API returns 401 (unauthorized) or 403 (forbidden) |

AUTOMATICALLY RUNNING TESTS AGAINST WEB APIS BASED ON SPECIFICATIONS

BACKGROUND

Technical Field

The present disclosure generally relates to computing resources, and more particularly, to testing whether a computing resource is described accurately.

Description of the Related Art

Today, programmers write applications using a growing variety of publicly accessible Web services. Applications can access and/or request these publicly accessible Web services by invoking their corresponding Web Application Programming Interfaces (web APIs). Such Web APIs have grown consistently over the years, as businesses realize the growth opportunities associated with running an open platform that developers can interact with. Common forms of interacting with these Web APIs include embedding external resources, such as tweets, Facebook comments, YouTube videos, Instagram photos, etc. Testing a Web API increases confidence in that the API performs as intended.

SUMMARY

According to various embodiments, a computing device, a non-transitory computer readable storage medium, and a method are provided to determine whether a specification is an accurate representation of an application program interface (API). The specification is received electronically over a network. Service calls to be tested are identified based on the specification. A test case is created for each of the identified service calls. A sequence is created for the test case for each of the identified service calls. A test plan is generated based on the created sequence. The generated test plan is executed. Upon identifying an error in response to the executed test plan, a notification is generated, indicating that the specification is not an accurate representation of the API.

In one embodiment, upon identifying no errors in response to the executed test plan, the specification is certified to be an accurate representation of the API.

In one embodiment, upon identifying an error in response to the executed test plan, the relevant portions of the specification related to the error are identified. The generated notification indicates these portions of the specification.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Overview

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

The present disclosure relates to systems and methods of implementing a testing platform. Applications increasingly use Web Application Programming Interfaces (hereinafter Web APIs) to programmatically interact with services. For example, Twitter and Facebook expose rich social networks through their APIs, Instagram enables programmatic access to millions of photos, or the IBM Watson APIs make diverse natural language capabilities accessible to applications. However, application developers using Web APIs face multiple challenges: APIs are to be discovered, selected, and understood to be correctly invoked, and these APIs are under the control of independent providers who can change the services in a way that may disrupt client code. Furthermore, even for purported standardized notions such as the APIs' Uniform Resource Locator (URL) structures, Hypertext Transfer Protocol (HTTP) methods, or status codes, the semantics can differ across APIs. For the specifics on how APIs should be used, application developers often depend on online documentations, many of which are semi-structured Hypertext Markup Language (HTML) based pages.

Various formats of API specifications attempt to unify the description of URL templates, HTTP request types, headers, parameters, and data required to interact with Web APIs. For example, the OpenAPI specification is a machine understandable format, which enables, among other things, automatic synthesis of API and client code in various languages and generation of consistent, interactive API documentations for human developers. Other API specifications include, without limitation, Web Application Description Language (WADL), which is an XML-based format that describes services in a machine-processable way and/or the Web Service Description Language (WSDL), which is an XML format for describing Web services, such as by defining ports and messages, RESTful API Modeling Language (RAML), which provides the information to describe RESTful or practically RESTful APIs, Web Application Description Language (WADL), which is a machine-readable XML description of HTTP-based web services, and API blueprint, which is a high-level API description language for Web API's.

These Web API Specifications describe how to interact with such APIs in a machine-understandable way. For example, they (i) define the endpoints to invoke, (ii) describe data sent to and received from a request, and (iii) define constraints on requests, such as headers, authentication, data formats, etc. Endpoints specify where resources lie that can be accessed by third party software. Usually the access is via a URI (Uniform Resource Identifier) to which HTTP requests are posed, and from which the response is thus expected. Put differently, the endpoints defined by the Web API specifications include the URL template and the HTTP method.

It is typical for API's to undergo constant change to accommodate evolving needs and/or to provide improvements. However, the specification should be kept consistent with the API implementation and its human-readable documentation. The API may change while the specification may not have been updated. Alternatively, the specification may not be an accurate representation of the features and functionality of the API. For example, endpoints may be added, removed, or reconfigured. The concepts discussed herein provide an automatic and efficient way of determining whether a specification is an accurate representation of its corresponding API. Upon identification of an error, one or more portions in the specification related to the error can be identified by, highlighting affected endpoints, data definitions, etc. Reference now is made in detail to the examples illustrated in the accompanying drawings and discussed below.

Example Architecture

Figure 1:
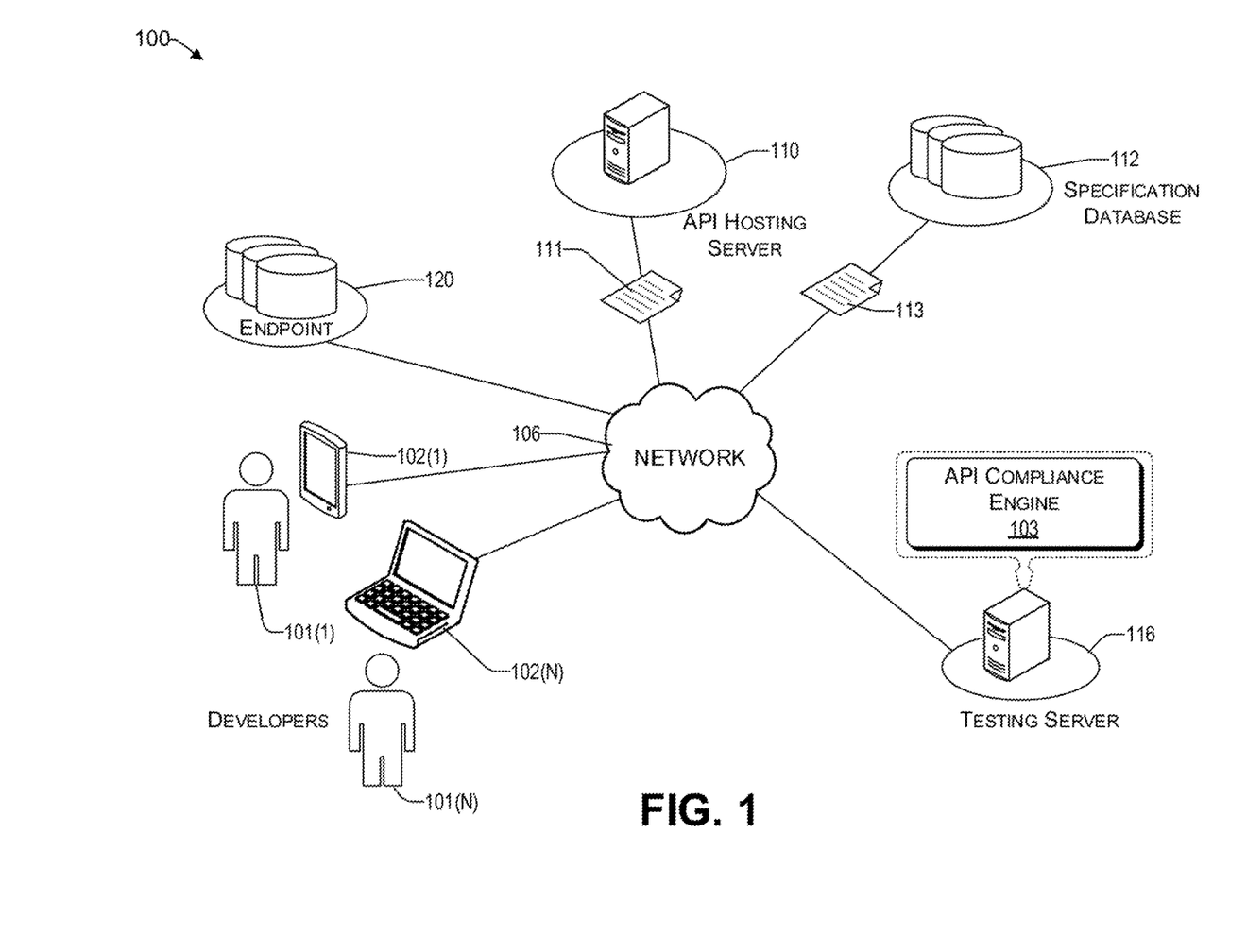
FIG. 1 illustrates an example architecture for implementing an Application Programming Interface specification compliance system.

FIG. 1 illustrates an example architecture 100 for implementing an API specification compliance system. Architecture 100 includes a network 106 that allows various software developers 101(1) to 101(N) to communicate with various Web resources such as APIs (that may be stored in one or more hosting servers such as server 110) and various endpoints (represented by endpoint 120), via a computing device 102, as well as any other components that are connected to the network 106, such as a specification database 112 and a testing server 116 that has an API specification compliance engine 103 running thereon.

The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet that provides various ancillary services, such as communication with various application stores, libraries, and the Internet. To facilitate the present discussion, network 106 will be described, by way of example only and not by way of limitation, as a mobile network as may be operated by a carrier or service provider to provide a wide range of mobile communication services and supplemental services or features to its subscriber customers and associated mobile device users. The network 106 allows the API compliance engine 103 on the testing server 116 to communicate with one or more developers 101, over their user device 102, to provide an API compliance service.

For purposes of later discussion, several user devices appear in the drawing, to represent some examples of the devices that may receive various services via the network 106. Today, user devices typically take the form of portable handsets, smart-phones, tablet computers, personal digital assistants (PDAs), and smart watches, although they may be implemented in other form factors, including consumer, and business electronic devices.

A user device (e.g., 102(1)) may have various applications and APIs stored in its memory, which may be at various stages of development, and may supplement these applications with various APIs 110 and endpoints 120 found on the Web. Upon completion, a developer may promote their API for public use, represented by the API hosting server 110, which may be in the cloud.

In one embodiment, there is a specification database 112 that includes specifications 113 of corresponding Web APIs. Each specification 113 is a machine-readable document that provides a complete explanation of the intended operation of the corresponding Web API, including its behavior and how it links to other Web APIs. It describes the components, such as endpoints, data, parameters, and the like, of the corresponding Web API and the intended behavior of the components.

For example, a specification 113 may describe to invoke an endpoint and the type of data that should be sent to the API. Further, the specification provides the expected response data to the requestor. Accordingly, the available functionality is specified and how to invoke a desired Web service (represented by way of example as an endpoint 120). These parameters and others are used by the API compliance engine 103 to later identify whether the API 111 performs as purported by the specification 113.

While the API hosting server 110, the specification database 112, and the testing server 116 are illustrated by way of example to be on different platforms, it will be understood that in various embodiments, the API hosting server, specification database, and the testing server 116 may be combined in various combinations. In other embodiments, these computing platforms may be implemented by virtual computing devices in the form of virtual machines or software containers that are hosted in a cloud, thereby providing an elastic architecture for processing and storage.

Example Specification Compliance System

Figure 2:
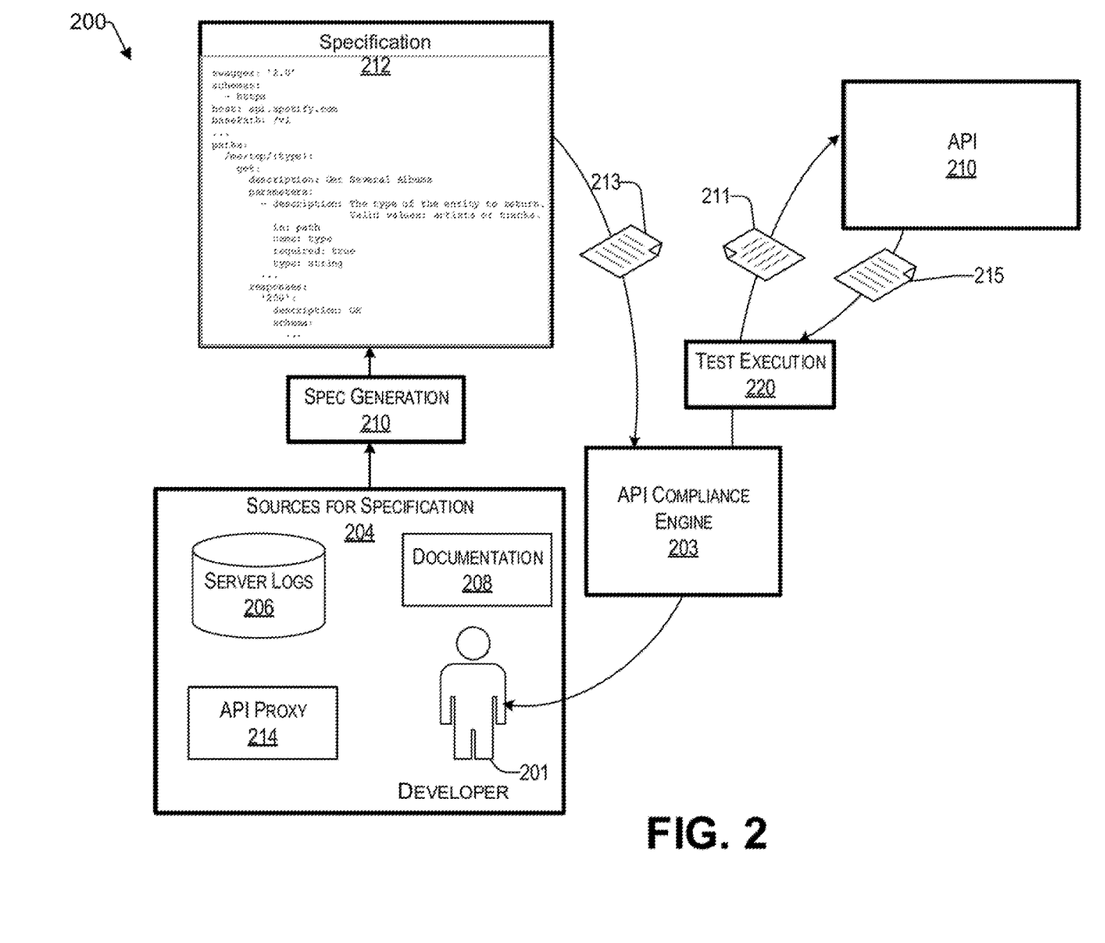
FIG. 2 illustrates a high-level block diagram of an Application Programming Interface specification compliance system, consistent with an illustrative embodiment.

FIG. 2 illustrates a high-level block diagram of an API specification compliance system 200, consistent with an illustrative embodiment. The system 200 includes an example specification 212 that may be both machine and human readable. In various embodiments, the specification can be generated by a developer 201 and/or a specification generation tool 210 that refers to various sources 204 to automatically create the specification 212. The various sources 204 for may include, without limitation, one or more application developers 201, prior documentation 208, and server logs 206. Accordingly, specifications can be inferred from server logs 206, can be extracted from online documentation (e.g., HTML), and can be inferred from proxying HTTP requests 214 to an AP 210.

Upon a trigger event, the API specification compliance engine 203 accesses a specification 212 in the form of a data file 213 that defines the API 210. A trigger event may be a request by a third-party software developer 201 who has developed the API 210 or is considering to use the API 210 and wants to confirm that the API 210 operates as purported by the specification 212. In other embodiments, a trigger event may be generated by the API compliance engine 203 to test an API against its specification at predetermined intervals. In one embodiment, the system 200 of the block diagram of FIG. 2 can be run automatically as part of a software development and information technology operations (DevOps) pipeline (e.g., whenever the API 210 is updated), as will be discussed in more detail later.

Based on the received specification 212, the API specification compliance engine 203 automatically generates tests having an intelligent sequence, discussed in more detail later. In one embodiment, there is a test execution module 220 that monitors serialized input, such as HTTP GET requests or other data provided by the executing test code to the Web service represented by the API 210. While the test execution module 220 is drawn outside the API specification compliance engine 203, in one embodiment, the test execution module 220 is part (i.e., a module) of the API specification compliance engine 203.

The API compliance engine 203 is configured to parse the content of the received specification 213 to identify Web service calls and the input parameters associated with each call, referred to herein as parameters of the specification. In various embodiments, the API compliance engine 203 can identify required and optional parameters, as well as various permutations of the parameters to test. In one embodiment, the different types and the number of permutations is based on a confidence level that is desired to be achieved. For example, sensitive applications, which may relate to security or authentication, may involve more permutations to provide a more comprehensive assessment of the API compliance with its specification.

Based on these parameters, the service calls to be tested on the API 210 are identified. The API compliance engine 203 is configured to create a test case for each service call to be tested for the API 210. For example, parameters from the received specification 213 may be used to obtain sample expected data (which can later be used to compare the results to). Significantly, the API compliance engine 203 is also configured to determine an intelligent sequence for the test cases. Upon establishing the sequence for the test cases, a test plan is generated by the API compliance engine 203. In various embodiments, the test plan can be an executable source code or in a format that an existing proprietary and/or open source Web service testing application can understand. For example, Web service testing applications such as SoapUI, Postman, Insomnia, Frisby.js, and the like, may be used to test the API 210. The test plan can then be executed via a test execution module 220 based on a test sequence generated by the API compliance engine 203.

While specifications 213 characterize the intended operation of an API 210, an actual order of testing is typically not provided by such specifications. In this regard, Applicants have recognized that the order in which tests are performed is salient for the overall determination of the compliance of the API 210 with the specification. By way of example, consider an API 210 that allows interaction with data, where several endpoints are invoked to provide access (e.g., write) to servers. The API 210 may also include other endpoints that allow the reading of the data. Accordingly, to determine whether the read-out functionality of the endpoint is functioning as purported by the specification, it is more efficient to first invoke the "write" operation before the "read" operation.

Further, some endpoints may only be invoked after other invocations succeed. For example, some invocations are allowed upon successful authentication invocations, which are typically described in specifications. For example, an OpenAPI specification may include "securityDefinitions" and authentication methods (e.g., basic auth, API key, OAuth, OAuth2, etc.). In this regard, the API compliance engine 203 would perform an authentication invocation, as described in the specification, before the other invocation.

The most-commonly-used HTTP invocations (sometimes referred to as methods or verbs), are POST, GET, PUT, PATCH, and DELETE. These correspond to create, read, update, and delete (or CRUD) operations, respectively. There are several other invocations, too, which are used less frequently, including OPTIONS and HEAD. For example, the GET, PUT, and DELETE invocations may depend on a previous POST. In other scenarios, there are dependencies between resources. For example, resource A should be ready before resource B can be created or an action C can be taken.

Figure 3:
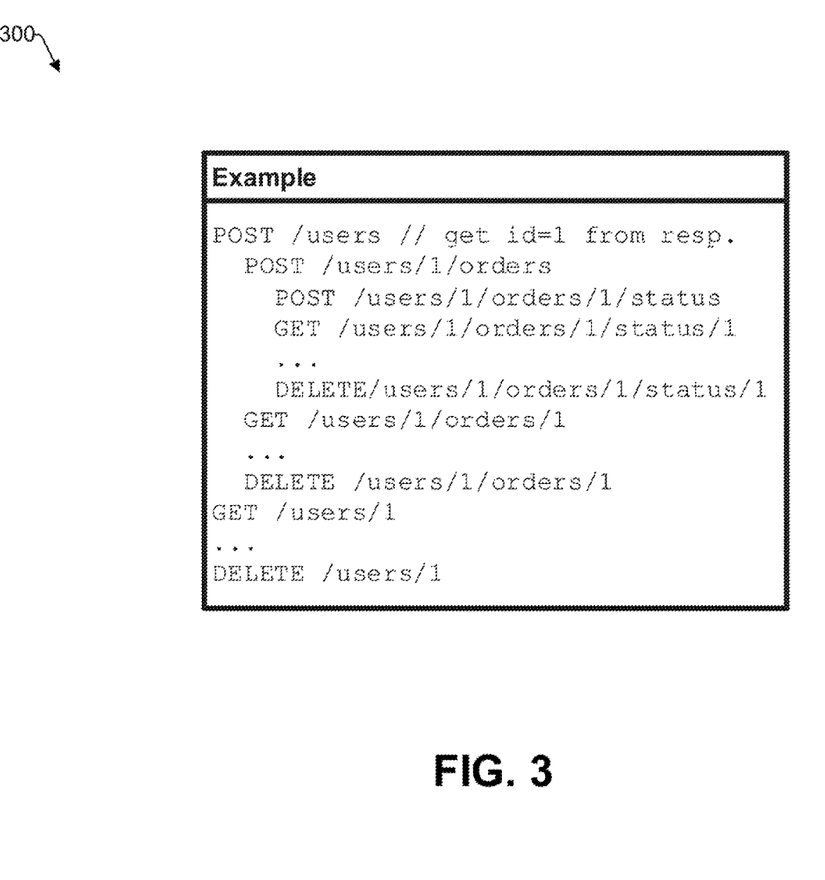
FIG. 3 illustrates an example order based on a heuristic.

If the specification does not provide an order for testing the API, the API compliance engine 203 is configured to create an appropriate sequence based on a heuristic. In this regard, FIG. 3 illustrates an example order based on a heuristic. For each resource, the API compliance engine 203 identifies the invocations involved. To the extent these invocations exist, the heuristic determines to initially perform POST requests, which are used to write resources to an API. Subsequently, GET/PUT/PATH operations, which rely on a resource being previously written, can be performed interchangeably. Finally, if existent, DELETE operations are performed to remove the once created resource. In some embodiments, the GET/PUT/PATCH invocations are interchangeable.

In some scenarios, the resources may be nested. For example, an invocation may lead to one or more other invocations. In this regard, a POST invocation is performed first (if supported by the API). For example, the resources (e.g., data) exposed by an API are hierarchically ordered, so that a child resource may be dependent on the existence of a parent resource. For example, the parent resource may be a "user." An "order" may be associated with that user, so that the order can only be created after the user has been created (and would cease to exist once the user ceases to exist). In one embodiment, our heuristic first performs a POST on the highest-level resource (i.e., the parent resource, e.g., the user). Before performing any other action on that user (e.g., GET/PUT/DELETE . . . ) the heuristic checks for the existence of a nested resource. If it exists, the heuristic performs a POST on that resource. This process is repeated until no further nested resource is found. In that case, the heuristic continues to perform other operations (e.g., GET/PUT/DELETE . . . ) on this lowest level resource. Upon completion, the heuristic moves one level up, and performs the operations on the second lowest resource etc., until finally performing the operation on the initial, highest-level resource (i.e., GET/PUT/DELETE . . . user).

In this way, upon reading back the stored information, both the write and read operations of the API would be verified. Presently, specifications do not provide guidance as to which tests should be performed first. Accordingly, by virtue of the intelligent test sequencing described herein, the correlation between the specification 212 and API 210 is more efficiently ascertained.

Example API Automation System

Figure 4:
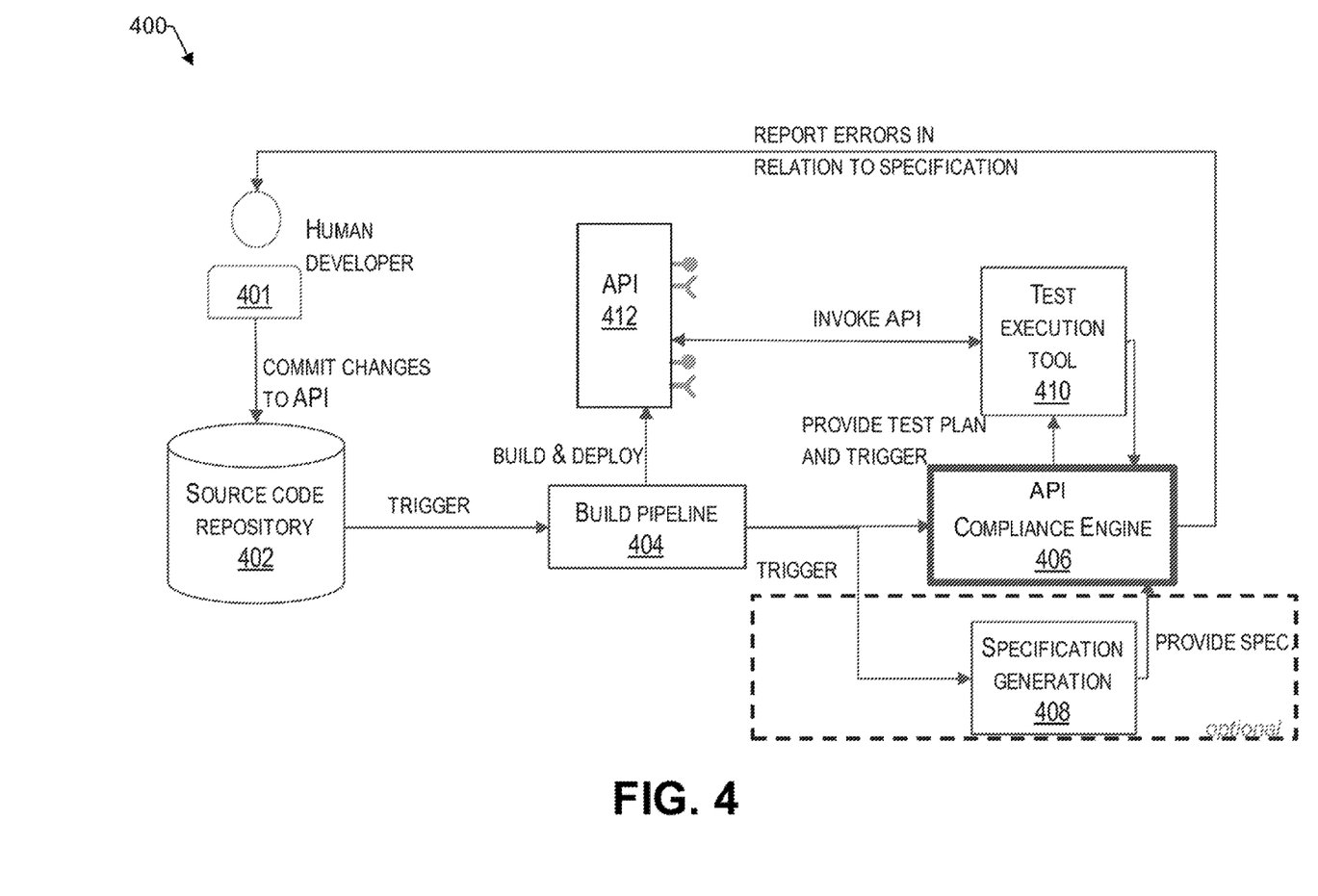
FIG. 4 illustrates an example block diagram of a software development and information technology operations (DevOps) system that includes an Application Programming Interface specification compliance engine.

Reference now is made to FIG. 4, which illustrates an example block diagram of a DevOps system 400 that includes an API specification compliance engine 406. The system 400 describes the collaboration and communication of one or more developers 401 and an automation system that builds, deploys, characterizes, and tests and API 412 with reference to its specification.

For example, a developer 401 may create or make changes to an API, which is stored in the form of a source code in a source code repository 402. The storage of the source code or the change of the source code of the API may trigger a build pipeline 404 to perform a sequence of operations that have been previously defined by software developers. For example, the build pipeline 404 may compile the source code 402 (e.g., build a program of the source code 402).

Automatic tests could be run to verify various functional aspects and/or security features of the source code. Upon confirmation that predetermined criteria of the test(s) performed in the build pipeline 404 are met, then the API 412 is built and deployed to be used in the public domain (which may be on the cloud). While a simple "build, test, and deploy" approach has been described herein for reasons of simplicity, it will be understood that the build pipeline may have additional complexity, such as hooks into ancillary systems (e.g., to email, social media, etc.).

At a predetermined interval or upon a trigger event (e.g., the build pipeline deploying the API 412), the API compliance engine 406 analyzes the API 412 in view of the specification, as discussed herein. In various embodiments, the specification may be generated by a developer of the API 412 or by a specification generation tool that automatically creates the specification based on parameters of the API 412. The API compliance engine 406 can then interact with the API 412 either directly or via a test execution tool 410 to perform tests at a sequence that is defined by the API compliance engine 406. In response to each test case, the API compliance engine 406 is configured to receive data from the API (which may be via the test execution tool 410). The response is analyzed for errors. In various embodiments, an error may be identified by comparing the data to expected data (from the specification) and/or interpretation of a received error code, as discussed in in more detail below.

Example Error Detection

Figure 5:
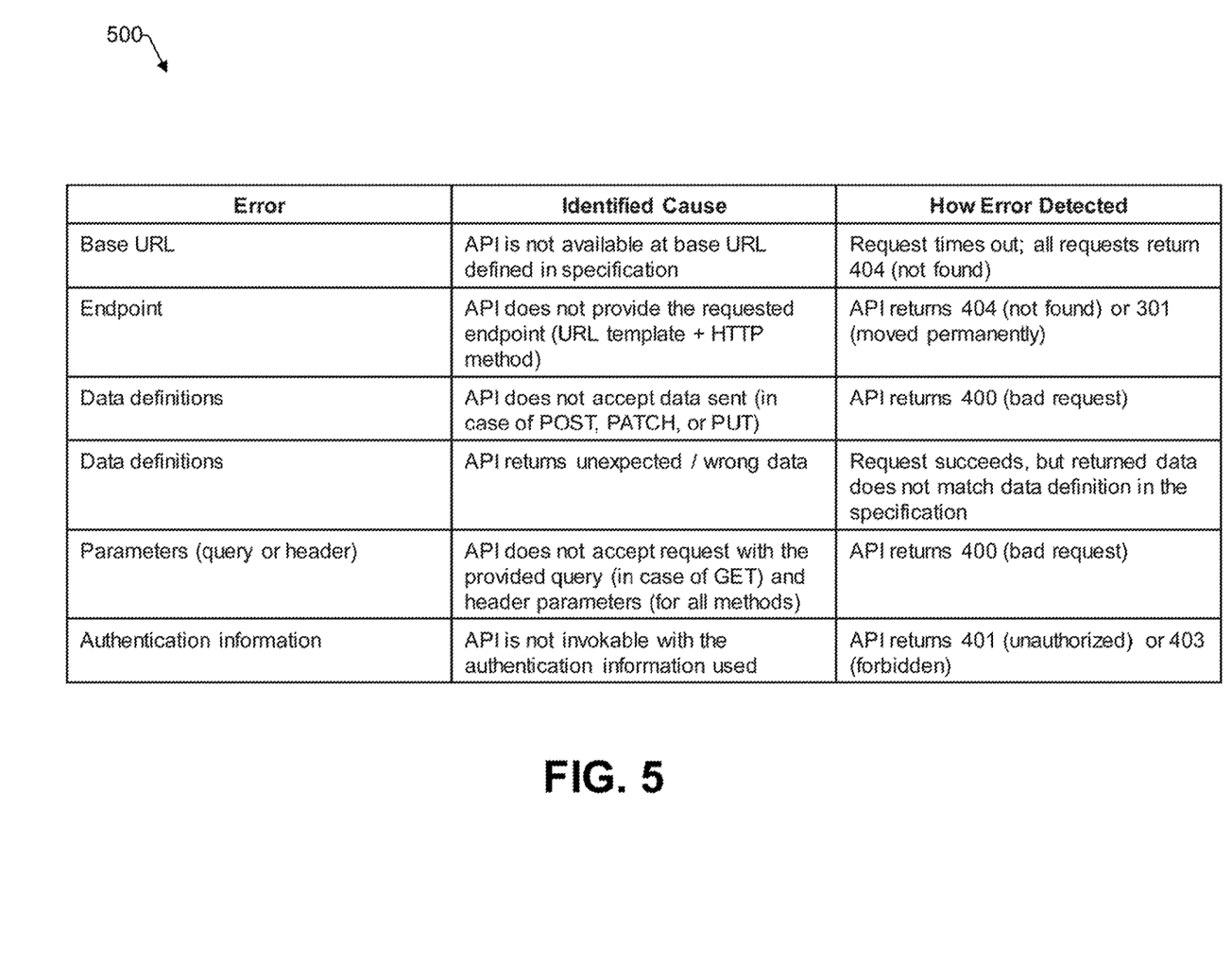
FIG. 5 is a table including a non-exhaustive list of example errors, consistent with an illustrative embodiment.

As discussed previously, errors may be determined in different ways. To that end, FIG. 5 is a table 500 including a non-exhaustive list of example errors. Observed runtime errors indicate that the specification and implementation are out of sync due to one or more factors, such as implementation errors (e.g., when considering the specification as reflecting the intended functionality), or outdated specifications (or documentations from which the specification was derived).

For example, if the error is with a base URL, the identified cause may lie in the API not being available at that URL. In this regard, the error may be detected by the request, sometimes referred to herein as an invocation, timing out and/or the request returning a Hypertext Transfer Protocol (HTTP) standard response of 404 error code, thereby indicating that that the client could communicate with a given server, but the server could not find what was requested. Similarly, if the error lies with an endpoint, the cause may relate to the API not providing the requested endpoint. In this regard, the API returns a 404 error code, indicating that the server could not find what was requested, or a 301 error code, indicating that the resource was moved permanently.

If an error is with data definitions, then the identified cause may relate to the API not accepting the data sent (e.g., for a POST, PATCH, or PUT request). In this regard, the API returns a 400 error code, which is a status code that indicates that the request sent to the Web server is incorrect or corrupted and the server can therefore not understand the request. However, if the API returns unexpected or incorrect data, it is indicative that the request itself has succeeded, but the returned data does not match a data definition in the specification.

If the error relates to a parameter (e.g., query or header), then the identified cause may relate to the API not accepting the request with the provided query (e.g., in a GET request) and header parameters (for all methods). In this regard, the API returns a 400 error code, as explained above. For example, query parameters are sent as part of a URL (the suffix starting with a question mark), while headers are sent as part of the HTTP header part. These parameters can be used, for example, to more precisely define what data to retrieve from an API (in case of a GET), how to authenticate, or how the API should go about answering a request. Sometimes, these parameters are required by an endpoint, such that their absence leads to a client error (with an error code in the 400 dreds).

In another example, if the error relates to authentication information, then the API is not invokable with the incorrect authentication information. In this regard, the API returns a 401 error code, indicating that the user is unauthorized due to invalid credentials, or a 403 error code, indicating that the operation is forbidden.

Upon identifying a discrepancy between the specification and the API, the error code, the request, and the location in the code of the request is stored in an appropriate location, such as a memory of the testing server 116, or a separate database that is dedicated to capturing the discrepancies.

Example Process

Figure 6:
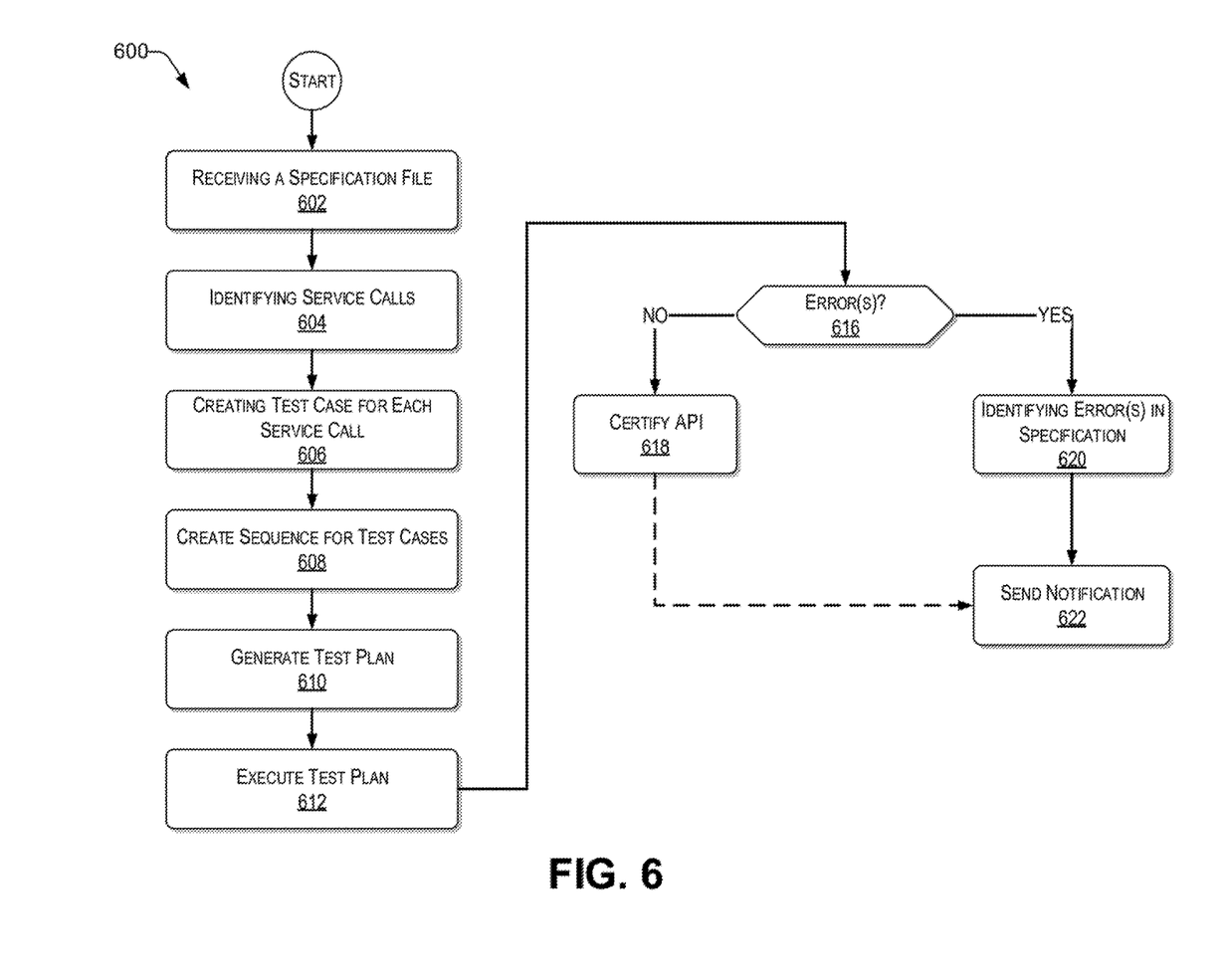
FIG. 6 presents an illustrative process for determining whether an Application Programming Interface performs as purported by its corresponding specification.

With the foregoing overview of the example architecture 100 and example block diagrams 200 and 400, it may be helpful now to consider a high-level discussion of an example process. To that end, FIG. 6 presents an illustrative process 600 for determining whether an API performs as purported by its corresponding specification.

Processes 600 is illustrated as a collection of blocks in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. The order in which the operations are described is not intended to be construed as a limitation, and any number of the described blocks can be combined in any order and/or performed in parallel to implement the process. For discussion purposes, the process 600 is described with reference to the architecture 100 of FIG. 1.

At block 602, upon a trigger event, the API specification compliance engine 103 of the testing server 116 accesses a specification file of an API 111. A trigger event may be a request by a third-party software developer 101, a notification that an API 111 has been deployed or altered, or may be generated by the API compliance engine 103 to test an API 111 against its specification 113 at predetermined intervals.

At block 604, the API compliance engine 103 identifies service calls to be tested on the API 111 based on the specification 113. To that end, the API compliance engine 103 parses the content of the accessed specification to identify Web service calls and the input parameters associated therewith.

At block 606, a test case is created for each service call to be tested for the API 111. For example, threshold criteria are set for later determining whether one or more criteria are met. In one embodiment, parameters from the received specification 113 are used to identify expected data.

At block 608, a sequence for the test cases is created based on the invocations of the service calls in the specification 113.

At block 610, a test plan is generated based on the created sequence. In various embodiments, the test plan can be an executable source code or in a format that an existing proprietary and/or open source Web service testing application can understand.

At block 612, the test plan is executed via a test plan execution module based on the determined sequence. Accordingly, the test cases are performed in an order that efficiently evaluates the API to determine whether it is in harmony with its corresponding specification 113. For example, for each test case, the API compliance engine 103 interacts with the API 111 over the network 106 via invocations, such as POST, GET, PUT, PATCH, and DELETE. The response from the API (or other endpoints 120) is then evaluated by the API compliance engine 103, as discussed herein. In one embodiment, each received response is stored in a suitable location, such as a memory of the testing server 116 or another repository that is configured to store the response data.

At block 616, the API compliance engine 103 determines whether there were one or more errors with respect to each test case. In various embodiments, an error may be identified via an error code (e.g., provided from the API 111 and/or endpoint 120) or via a comparison to expected data extracted previously from the specification 113. Upon determining that the execution of the test plan identified no errors (i.e., "NO" at decision block 616), the process continues with block 618, where the API 111 is certified to function as purported by its specification 113. In one embodiment, a notification is sent (i.e., 622) to an appropriate recipient to indicate the same. For example, the developer 101 of the API and/or an administrator of the API 111 may be notified that the specification 113 accurately represents the functionality of the API 111.

However, upon determining that there are one or more errors, (i.e., "YES" at decision block 616), the process continues with block 620, where, for each error, the relevant portion of the specification is identified and stored in a memory of the testing server 116. The one or more errors, are then reported via a notification (i.e., block 622). For example, an alert module of the API compliance engine 103 provisions an alert to one or more authorized entities, such as the developer 101, administrator of the API hosting server 110, and/or other known users of the API, to indicate that the specification is not an accurate representation of the API. In one embodiment, the notification includes the identified portions of the specification by highlighting affected endpoints, data definitions, etc.

Example Computer Platform

Figure 7:
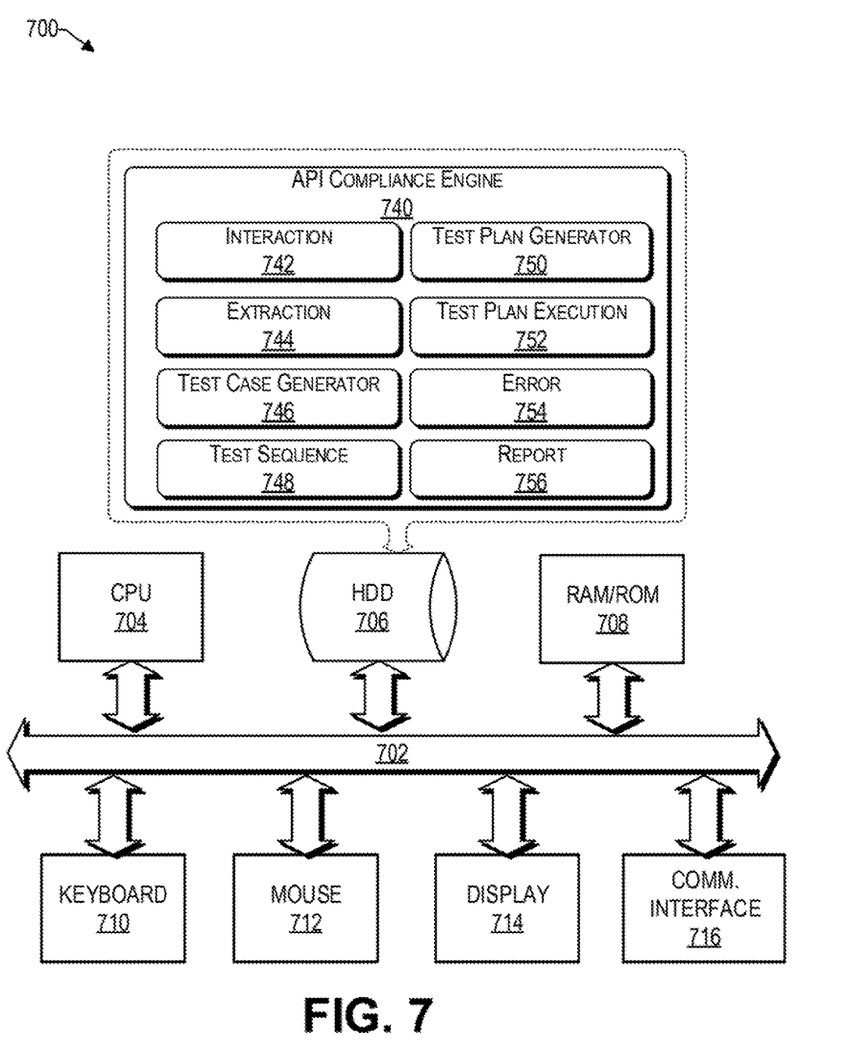
FIG. 7 is a functional block diagram illustration of a computer hardware platform that can communicate with various networked components, consistent with an illustrative embodiment.

As discussed above, functions relating to determining whether a specification is an accurate representation of an API can be performed with the use of one or more computing devices connected for data communication via wireless or wired communication, as shown in FIG. 1 and in accordance with the process 600 of FIG. 6. FIG. 7 is a functional block diagram illustration of a computer hardware platform that can communicate with various networked components, such as a developer, API hosting server, specification database, various endpoints, etc. In particular, FIG. 7 illustrates a network or host computer platform 700, as may be used to implement a server, such as the testing server 116 of FIG. 1.

The computer platform 700 may include a central processing unit (CPU) 704, a hard disk drive (HDD) 706, random access memory (RAM) and/or read only memory (ROM) 708, a keyboard 710, a mouse 712, a display 714, and a communication interface 716, which are connected to a system bus 702.

In one embodiment, the HDD 706, has capabilities that include storing a program that can execute various processes, such as the API compliance engine 740, in a manner described herein. The API compliance engine 740 may have various modules configured to perform different functions.

For example, there may be an interaction module 742 that is operative to identify trigger events to initiate the comparison between the specification and the API discussed herein.

In one embodiment, there is an extraction module 744 operative to receive a specification of an identified API and parse the contents thereof to identify Web service calls and input parameters associated with each Web service call. In one embodiment, the extraction module identifies expected data from the specification for later validating returned data.

In one embodiment, there is a test case module 746 operative to create a test case for each service call identified in the specification for the subject API. These test cases are typically not executable.

In one embodiment, there is a test sequence module 748 operative to create an order for the tests to be performed, based on the information harvested from the specification of a subject API.

In one embodiment, there is a test plan generator module 750 operative to provide a series of instructions that are executable and/or in a form that can be read by a Web service testing application, which may be part of the test plan execution module 752 discussed below.

In one embodiment, there is a test plan execution module 752 operative to execute the test plan provided by the test plan generator module 750.

In one embodiment, there is an error module 754 operative to identify any errors that are generated in response to the execution of the test plan. Errors may be identified in various ways, including by way of receipt of an error code from an endpoint and/or failure of validation of return data. In one embodiment, the error module can identify portions of the specification that relate to the corresponding error(s).

In one embodiment, there is a report module operative to report the compliance of the speciation with the subject API or failure thereof, to one or more appropriate recipients.

In one embodiment, a program, such as Apache™, can be stored for operating the system as a Web server. In one embodiment, the HDD 706 can store an executing application that includes one or more library software modules, such as those for the Java™ Runtime Environment program for realizing a JVM (Java™ virtual machine).

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computing device comprising:
   a processor;
   a network interface coupled to the processor to enable communication over a network;
   a storage device coupled to the processor;
   a compliance engine software stored in the storage device, wherein an execution of the software by the processor configures the computing device to perform acts comprising:
   receiving an electronic specification defining an application program interface (API), over the network;
   identifying service calls to be tested based on the specification;
   creating a test case for each of the identified service calls;
   creating a sequence for the created test cases, for an efficient correlation between the specification and the API, wherein the sequence for the created test cases comprises:

automatically identifying one or more Hypertext Transfer Protocol (HTTP) invocations comprising at least one of: POST, GET, PUT, PATCH, or DELETE invocation;
automatically ordering any identified POST invocation before any GET, PUT, PATCH, and DELETE invocation; and
automatically ordering any DELETE invocation after any POST, GET, PUT, and PATCH invocation;
generating a test plan based on the created sequence;
executing the generated test plan; and
upon identifying an error in response to the executed test plan, generating a notification indicating that the specification is not an accurate representation of the API.

2. The computing device of claim 1, wherein identifying service calls to be tested comprises parsing a text of the specification to identify Web service calls and one or more input parameters associated with each Web service call.

3. The computing device of claim 1, wherein creating a test case for each of the identified service calls comprises identifying one or more threshold criteria for an error.

4. The computing device of claim 3, wherein the one or more threshold criteria comprises at least one of: (i) receiving a Hypertext Transfer Protocol (HTTP) error code over the network, or (ii) a discrepancy between an expected data and a received data, in response to the execution of the test case.

5. The computing device of claim 1, wherein generating the test plan comprises creating an executable source code.

6. The computing device of claim 1, wherein generating the test plan comprises translating the sequence of the created test cases in a format that a Web service testing application understands.

7. The computing device of claim 1, wherein executing the generated test plan comprises, for each test case:
sending a Hypertext Transfer Protocol (HTTP) requests to the API;
receiving a response to the HTTP request; and
storing the response in the storage device.

8. The computing device of claim 1, wherein execution of the compliance engine by the processor further configures the computing device to perform an act comprising: upon identifying no errors in response to the executed test plan, certifying that the specification is an accurate representation of the API.

9. The computing device of claim 1, wherein execution of the compliance engine by the processor further configures the computing device to perform acts comprising, upon identifying an error in response to the executed test plan:
identifying a portion of the specification related to the error; and
indicating the portion of the specification in the generated notification.

10. The computing device of claim 9, wherein execution of the compliance engine by the processor further configures the computing device to perform acts comprising, upon identifying an error in response to the executed test plan, sending the notification to a developer of the API.

11. A non-transitory computer readable storage medium tangibly embodying a computer readable program code having computer readable instructions that, when executed, causes a computer device to carry out a method of determining whether a specification is an accurate representation of an application program interface (API), the method comprising:
receiving the specification electronically, over a network;
identifying service calls to be tested based on the specification;
creating a test case for each of the identified service calls;
creating a sequence for the created test cases, for an efficient correlation between the specification and the API, wherein the sequence for the created test cases comprises:
automatically identifying one or more Hypertext Transfer Protocol (HTTP) invocations comprising at least one of: POST, GET, PUT, PATCH, or DELETE invocation;
automatically ordering any identified POST invocation before any GET, PUT, PATCH, and DELETE invocation; and
automatically ordering any DELETE invocation after any POST, GET, PUT, and PATCH invocation;
generating a test plan based on the created sequence;
executing the generated test plan; and
upon identifying an error in response to the executed test plan, generating a notification indicating that the specification is not an accurate representation of the API.

12. The non-transitory computer readable storage medium of claim 11, wherein identifying service calls to be tested comprises parsing a text of the specification to identify Web service calls and one or more input parameters associated with each Web service call.

13. The non-transitory computer readable storage medium of claim 11, wherein creating a test case for each of the identified service calls comprises identifying one or more threshold criteria for an error.

14. The non-transitory computer readable storage medium of claim 13, wherein the one or more threshold criteria comprises at least one of: (i) receiving a Hypertext Transfer Protocol (HTTP) error code over the network, or (ii) a discrepancy between an expected data and a received data, in response to the execution of the test case.

15. The non-transitory computer readable storage medium of claim 11, wherein generating the test plan comprises creating an executable source code.

16. The non-transitory computer readable storage medium of claim 11, wherein executing the generated test plan comprises, for each test case:
sending a Hypertext Transfer Protocol (HTTP) requests to the API;
receiving a response to the HTTP request; and
storing the response in the storage device.

17. The non-transitory computer readable storage medium of claim 11, further comprising, upon identifying no errors in response to the executed test plan, certifying that the specification is an accurate representation of the API.

18. The non-transitory computer readable storage medium of claim 11, further comprising, upon identifying an error in response to the executed test plan:
identifying a portion of the specification related to the error; and
indicating the portion of the specification in the generated notification.

* * * * *